United States Patent [19]

Klier et al.

[11] Patent Number: 5,403,920
[45] Date of Patent: Apr. 4, 1995

[54] REACTIVE DIAZO DYES, HAVING A FIBRE REACTIVE GROUP CONTAINING A NAPHTYLENE MIDDLE COMPONENT

[75] Inventors: Herbert Klier, Bad Krozingen-Biengen, Germany; Athanassios Tzikas, Pratteln, Switzerland

[73] Assignee: Ciba-Geigy Corporation, Ardsley, N.Y.

[21] Appl. No.: 94,647

[22] Filed: Jul. 19, 1993

[30] Foreign Application Priority Data

Jul. 23, 1992 [CH] Switzerland ............... 2316/92

[51] Int. Cl.⁶ .................. C09B 62/513; D06P 1/38
[52] U.S. Cl. ........................ 534/635; 534/637; 534/642; 8/549
[58] Field of Search ............... 534/635, 637, 642

[56] References Cited

U.S. PATENT DOCUMENTS

| | | | |
|---|---|---|---|
| 4,185,012 | 1/1980 | Meininger et al. | 534/642 X |
| 4,766,206 | 8/1988 | Tzikas | 534/619 |
| 4,900,813 | 2/1990 | Tzikas et al. | 534/642 X |

FOREIGN PATENT DOCUMENTS 0167858  1/1986  European Pat. Off. .

OTHER PUBLICATIONS

Patent Abstract JP-A-60/217269, vol. 10 (1985).

*Primary Examiner*—Robert W. Ramsuer
*Assistant Examiner*—Fiona T. Powers
*Attorney, Agent, or Firm*—Kevin T. Mansfield

[57] ABSTRACT

Reactive dyes of the formula

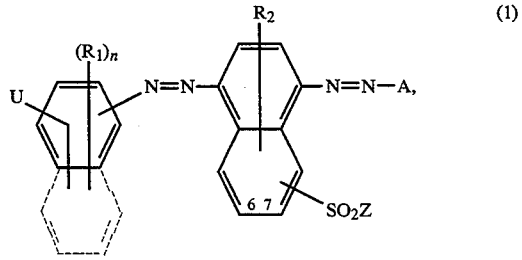

in which A, U, $R_1$, $R_2$, Z and n are as defined in claim 1, are particularly suitable for dyeing or printing cellulosic fibre materials or naturally occurring or synthetic polyamide fibre materials with a high tinctorial yield and produce dyeings and prints with good fastness properties.

11 Claims, No Drawings

REACTIVE DIAZO DYES, HAVING A FIBRE REACTIVE GROUP CONTAINING A NAPHTYLENE MIDDLE COMPONENT

The present invention relates to novel reactive dyes, processes for their preparation and their use for dyeing or printing fibre materials.

The practice of dyeing with reactive dyes has recently led to increased requirements on the quality of the dyeings and the economy of the dyeing process. Consequently, there continues to be a need for novel reactive dyes which have improved properties, especially in respect of application.

Reactive dyes which have an adequate substantivity and at the same time readily permit the non-fixed portions to be washed out are now required for dyeing. They furthermore should have a good tinctorial yield and high reactivity, and dyeings having high degrees of fixing should be produced in particular. These requirements are not met by the known dyes in all their properties.

The present invention is based on the object of discovering novel, improved reactive dyes which are used for dyeing and printing fibre materials and have the qualities characterised above to a high degree. The novel dyes in particular should be distinguished by high fixing yields and high fibre-dye bond stabilities, and moreover the portions which are not fixed on the fibre should be easy to wash off. They should furthermore produce dyeings having good all-round properties, for example fastness to light and to wet conditions.

It has been found that the object described is largely achieved with the novel reactive dyes defined below.

The invention therefore relates to reactive dyes of the formula

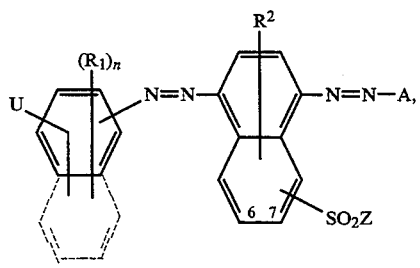   (1)

in which A is a radical of the benzene series, the naphthalene series or the heterocyclic series, $R_1$ and $R_2$ independently of one another are hydrogen, $C_1$–$C_4$alkyl, $C_1$–$C_4$alkoxy, $C_2$–$C_4$alkanoylamino, halogen or sulfo, Z is a group of the formula —CH=CH$_2$ or —CH$_2$—CH$_2$—Y and Y is a leaving group, n is the number 1, 2 or 3 and U is a reactive radical of the formula

   (2)

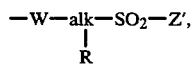   (2a)

—W—alk—E—alk'—SO$_2$—Z',   (2b)

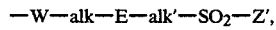   (2c)

or

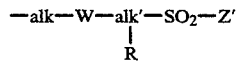   (2d)

in which W is a group of the formula —SO$_2$—NR$_3$—, —CONR$_3$— or —NR$_3$CO—, R$_3$ is hydrogen, $C_1$–$C_4$alkyl which is unsubstituted or substituted by hydroxyl, sulfo, sulfato, carboxyl or cyano, or a radical of the formula

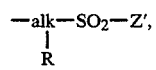

R is hydrogen, hydroxyl, sulfo, sulfato, carboxyl, cyano, halogen, $C_1$–$C_4$alkoxycarbonyl, $C_1$–$C_4$alkanoyloxy, carbamoyl or the group —SO$_2$—Z', Z' is as defined above for Z, E is the radical —O— or —NR$_4$—, R$_4$ is hydrogen or $C_1$–$C_4$alkyl and alk and alk' independently of one another are $C_1$–$C_6$alkylene.

$C_1$–$C_4$Alkyl $R_1$ and $R_2$ independently of one another are methyl, ethyl, propyl, isopropyl, butyl, isobutyl, sec-butyl or tert-butyl, in particular methyl.

$C_1$–$C_4$Alkoxy $R_1$ and $R_2$ independently of one another are methoxy, ethoxy, propoxy, isopropoxy, butoxy, isobutoxy, sec-butoxy or tert-butoxy, in particular methoxy.

$C_2$–$C_4$Alkanoylamino $R_1$ and $R_2$ independently of one another are, for example, acetylamino or propionylamino, in particular acetylamino.

Halogen $R_1$ and $R_2$ independently of one another are, for example, fluorine, bromine or, in particular, chlorine.

Examples of suitable leaving groups Y are —Cl, —Br, —F, —OSO$_3$H, —SSO$_3$H, —OCO—CH$_3$, —OPO$_3$H$_2$, —OCO—CCl$_3$, —OCO—CHCl$_2$, —OCO—CH$_2$Cl, —OSO$_2$—$C_1$–$C_4$alkyl, —OSO$_2$—N($C_1$–$C_4$alkyl)$_2$ or —OCO—C$_6$H$_5$.

Y is preferably a group of the formula —Cl, —OSO$_3$H, —SSO$_3$H, —OCO—CH$_3$, —OCO—C$_6$H$_5$ or —OPO$_3$H$_2$, in particular —Cl or —OSO$_3$H, preferably —OSO$_3$H.

alk and alk' independently of one another are, for example, a methylene, ethylene, 1,3-propylene, 1,4-butylene, 1,5-pentylene or 1,6-hexylene radical or branched isomers thereof.

alk and alk' are preferably a $C_1$–$C_4$alkylene radical, and particularly preferably an ethylene radical.

R is preferably hydrogen or the group —SO$_2$—Z', in which Z' is as defined above. R is particularly preferably hydrogen.

R$_3$ is preferably hydrogen, $C_1$–$C_4$alkyl, such as methyl, ethyl, propyl, isopropyl, butyl, isobutyl, sec-butyl or tert-butyl, or a group -alk-SO$_2$—Z', in which alk and Z' in each case are as defined above. R$_3$ is particularly preferably hydrogen.

E is preferably —NH— or —O—, and particularly preferably —O—.

W is preferably a group of the formula —CONH— or —NHCO—, in particular a group of the formula —CONH—.

The radical —SO$_2$Z is preferably bonded to the naphthylene central component in the 6- or 7-position.

The radical A in the reactive dye of the formula (1) can contain the substituents customary in organic dyes.

Examples of substituents in the radical A are: alkyl groups having 1 to 12 carbon atoms, in particular 1 to 4 carbon atoms, such as methyl, ethyl, propyl, isopropyl or butyl, alkoxy groups having 1 to 8 carbon atoms, in particular 1 to 4 carbon atoms, such as methoxy, ethoxy, propoxy, isopropoxy or butoxy, alkanoylamino groups having 2 to 8 carbon atoms, in particular 2 to 4 carbon atoms, such as acetylamino or propionylamino, phenyl- or naphthylamino, alkoxycarbonylamino groups having 2 to 8 carbon atoms, in particular 2 to 4 carbon atoms, alkanoyl groups having 2 to 8 carbon atoms, in particular 2 to 4 carbon atoms, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, phenyl- or naphthylsulfonyl, alkoxycarbonyl having 1 to 4 carbon atoms in the alkoxy radical, such as methoxycarbonyl or ethoxycarbonyl, benzoyl, benzoylamino which is unsubstituted or substituted by $C_1$-$C_4$alkyl on the nitrogen, phenyl, naphthyl, amino, amino which is mono- or disubstituted by $C_1$-$C_{12}$alkyl, phenyl, naphthyl or cyano, trifluoromethyl, nitro, cyano, hydroxyl, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-($\beta$-hydroxyethyl)-sulfamoyl, N,N-di-($\beta$-hydroxyethyl)-sulfamoyl, N-phenylsulfamoyl, ureido, carboxyl, sulfomethyl, sulfo or sulfato, and fibre-reactive radicals, it being possible for the substituents containing an alkyl, phenyl or naphthyl radical to be further substituted in the alkyl, phenyl or naphthyl radical, for example by the substituents defined above for A. The alkyl radicals furthermore can be interrupted by oxygen (—O—). Preferred substituents containing an alkyl radical are those which can be interrupted by oxygen in the alkyl radical (with the exception of methyl) and can be substituted, for example, by hydroxyl, sulfo, sulfato, cyano, $C_5$-$C_7$cycloalkyl which is unsubstituted or further substituted by $C_1$-$C_4$alkyl, or phenyl or naphthyl which is unsubstituted or further substituted by $C_1$-$C_4$alkyl, $C_1$-$C_4$alkoxy, $C_2$-$C_4$alkanoylamino, halogen or sulfo. Preferred substituents containing a phenyl or naphthyl radical are those which can be further substituted in the phenyl or naphthyl radical by $C_1$-$C_4$alkyl, $C_1$-$C_4$alkoxy, $C_2$-$C_4$alkanoylamino, halogen or sulfo.

Fibre-reactive radicals in the radical A are, for example:

a) the abovementioned reactive radicals of the formulae (2), (2a), (2b), (2c) and (2d), for which the radicals are as defined and as preferred above;

b) reactive radicals of the formula

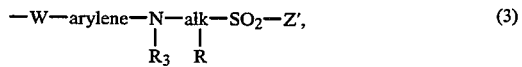

in which W, R, $R_3$, Z' and alk are as defined and as preferred above and arylene is a phenylene or naphthylene radical which is unsubstituted or substituted by sulfo, carboxyl, $C_1$-$C_4$alkyl, $C_1$-$C_4$alkoxy or halogen;

c) reactive radicals of the formula

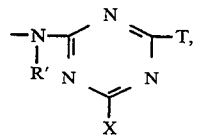

in which R' is hydrogen or $C_1$-$C_4$alkyl which is unsubstituted or substituted by carboxyl, cyano, hydroxyl, sulfo or sulfato, X is a group which can be removed as an anion and T is a group which can be removed as an anion, or is a non-reactive radical or a reactive radical of the formula

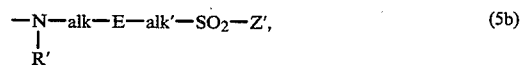

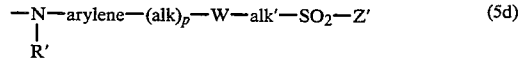

or

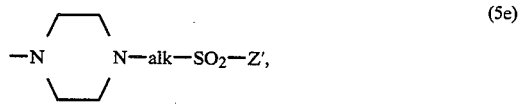

in which R, R', $R_3$, E, W, Z', alk, alk' and arylene are as defined and as preferred above and
p is 0 or 1; and d) reactive radicals of the formula

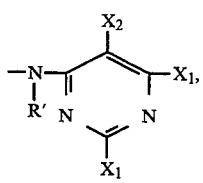

in which R' is as defined above, one of the radicals $X_1$ is a group which can be removed as an anion and the other radical $X_1$ is a non-reactive substituent or a radical of the formulae (5a) to (5e) or a group which can be removed as an anion and $X_2$ is a negative substituent.

R' is preferably hydrogen or a $C_1$-$C_4$alkyl radical, and particularly preferably hydrogen, methyl or ethyl.

Arylene is preferably a 1,3- or 1,4-phenylene radical, which is unsubstituted or substituted, for example, by sulfo, methyl, methoxy or carboxyl.

X is, for example, fluorine, chlorine, bromine, sulfo, $C_1$-$C_4$alkylsulfonyl or phenylsulfonyl, and preferably fluorine or chlorine.

A group T which can be removed as an anion is, for example, fluorine, chlorine, bromine, sulfo, $C_1$-$C_4$alkylsulfonyl or phenylsulfonyl, and preferably fluorine or chlorine.

A non-reactive substituent T can be, for example, a hydroxyl, $C_1$-$C_4$alkoxy, $C_1$-$C_4$alkylthio or amino radical, an N-$C_1$-$C_4$alkylamino or N,N-di-$C_1$-$C_4$alkylamino radical in which the alkyl is unsubstituted or substituted, for example, by sulfo, sulfato, hydroxyl, carboxyl or phenyl, or a cyclohexylamino or morpholino radical, or an N-$C_1$-$C_4$alkyl-N-phenylamino or phenylamino or naphthylamino radical, in which the phenyl or naphthyl is unsubstituted or substituted, for example, by $C_1$-$C_4$alkyl, $C_1$-$C_4$alkoxy, carboxyl, sulfo or halogen.

Examples of suitable non-reactive substituents T are amino, methylamino, ethylamino, $\beta$-hydroxyethylamino, N,N-di-$\beta$-hydroxyethylamino, $\beta$-sulfoethylamino, cyclohexylamino, morpholino, o-, m- or p-chlorophenylamino, o-, m- or p-methylphenylamino, o-, m- or p-methoxyphenylamino, o-, m- or p-sulfophenylamino, disulfophenylamino, o-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or iso-propoxy and hydroxyl.

A non-reactive substituent T is preferably amino, N-$C_1$-$C_4$alkylamino, which is unsubstituted in the alkyl part or substituted by hydroxyl, sulfato or sulfo, morpholino or phenylamino or N-$C_1$-$C_4$alkyl-N-phenylamino, in which the phenyl in each case is unsubstituted or substituted by sulfo, carboxyl, methyl or methoxy.

Particularly preferred non-reactive substituents T are morpholino and N-$C_1$-$C_4$alkyl-N-phenylamino or phenylamino, in which the phenyl in each case is unsubstituted or substituted by sulfo, carboxyl, methyl or methoxy, in particular sulfo.

The radical $X_1$ which can be removed as an anion is preferably fluorine or chlorine.

A non-reactive substituent $X_1$, for example, is as defined and as preferred above for a non-reactive substituent T.

Examples of suitable radicals $X_2$ are nitro, cyano, $C_1$-$C_4$alkylsulfonyl, carboxyl, chlorine, hydroxyl, $C_1$-$C_4$alkoxysulfonyl, $C_1$-$C_4$alkylsulfinyl, $C_1$-$C_4$alkoxycarbonyl and $C_2$-$C_4$alkanoyl, and $X_2$ is preferably chlorine, cyano or methylsulfonyl. $X_2$ is particularly preferably chlorine.

Preferred reactive radicals of the formula (4) are those in which T is a group which can be removed as an anion, in particular fluorine or chlorine, or is a non-reactive radical, a non-reactive substituent T being as defined and as preferred above.

Especially preferred reactive radicals of the formula (4) are those in which X is fluorine or chlorine and T is fluorine, chlorine or a non-reactive radical, a non-reactive substituent T being as defined and as preferred above.

Preferred reactive radicals of the formula (6) are those in which the two substituents $X_1$ are a group which can be removed as an anion, in particular chlorine or fluorine. $X_2$ is preferably chlorine.

Especially preferred reactive radicals of the formula (6) are those in which the two substituents $X_1$ are fluorine and $X_2$ is chlorine.

Reactive radicals as substituents of the radical A are, in particular, the reactive radicals of the formulae (4) and (6), the reactive radicals of the formulae (4) and (6) being as defined and as preferred above.

Preferred substituents of the radical A are $C_1$-$C_4$alkyl, $C_1$-$C_4$alkoxy, $C_2$-$C_6$alkanoylamino, or $C_2$-$C_8$alkoxycarbonylamino, or phenyl, phenylamino or benzoylamino which is unsubstituted or substituted by $C_1$-$C_4$alkyl, $C_1$-$C_4$alkoxy, $C_2$-$C_4$alkanoylamino, halogen or sulfo, or cyano, hydroxyl, carboxyl, carbamoyl, sulfomethyl, halogen, sulfo, sulfato, amino or amino which is substituted by cyano or $C_1$-$C_{12}$alkyl, in which the $C_1$-$C_{12}$alkyl radical is unsubstituted or substituted by phenyl, naphthyl, $C_5$-$C_7$cycloalkyl, hydroxyl, sulfo or sulfato, the phenyl and naphthyl radical can be further substituted by $C_1$-$C_4$alkyl, $C_1$-$C_4$alkoxy, $C_2$-$C_4$alkanoylamino, halogen or sulfo, the $C_5$-$C_7$cycloalkyl radical can be further substituted by $C_1$-$C_4$alkyl, and the $C_1$-$C_{12}$alkyl radical, with the exception of methyl, can be interrupted by oxygen. Further preferred substituents of the radical A are reactive radicals which are as defined and as preferred above.

The radical A is preferably a benzene, naphthalene, pyrimidine, 6-hydroxypyrid-2-one, pyrazolone or 2,6-diaminopyridine radical which is substituted or unsubstituted, in particular a benzene, naphthalene, pyrimidine, 6-hydroxypyrid-2-one or 2,6-diaminopyridine radical which is substituted or unsubstituted, the substituents being, in particular, as defined and as preferred above.

The radical A is especially preferably a radical of the formula

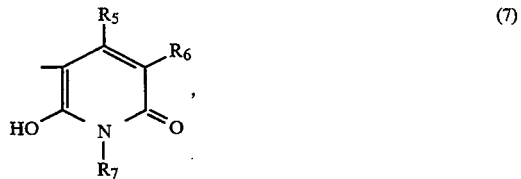

(7)

in which $R_5$ and $R_7$ independently of one another are hydrogen, $C_1$-$C_4$alkyl or phenyl which is unsubstituted or substituted by $C_1$-$C_4$alkyl, $C_1$-$C_4$alkoxy, $C_2$-$C_4$alkanoylamino, halogen or sulfo, and $R_6$ is hydrogen, cyano, carbamoyl or sulfomethyl, or a radical of the formula

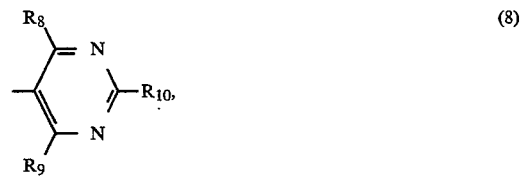

(8)

in which $R_8$ and $R_9$ independently of one another are hydroxyl, amino or amino which is substituted by $C_1$-$C_{12}$alkyl, in which the $C_1$-$C_{12}$alkyl radical is unsubstituted or further substituted by hydroxyl, sulfo or sulfato and, with the exception of methyl, can be interrupted by oxygen, and $R_{10}$ is hydrogen, $C_1$-$C_4$alkyl, hydroxyl, amino which is unsubstituted or substituted by cyano or phenyl which is unsubstituted or substituted by $C_1$-$C_4$alkyl, $C_1$-$C_4$alkoxy, $C_2$-$C_4$alkanoylamino, halogen or sulfo, or a radical of the formula

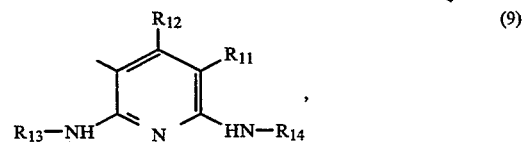

(9)

in which R$_{11}$ is cyano, carbamoyl or sulfomethyl, R$_{12}$ is C$_1$–C$_4$alkyl and R$_{13}$ and R$_{14}$ independently of one another are hydrogen, a halopyrimidine or halotriazine reactive radical which is further substituted or unsubstituted or C$_1$–C$_{12}$alkyl which is unsubstituted or substituted by hydroxyl, sulfo or sulfato, in which the C$_1$–C$_{12}$alkyl radical, with the exception of methyl, can be interrupted by oxygen, or a radical of the formula

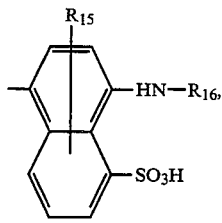
(10)

in which R$_{15}$ is hydrogen, C$_1$–C$_4$alkyl, C$_1$–C$_4$alkoxy, C$_2$–C$_4$alkanoylamino, halogen or sulfo and R$_{16}$ is phenyl which is unsubstituted or substituted by C$_1$–C$_4$alkyl, C$_1$–C$_4$alkoxy, C$_2$–C$_4$alkanoylamino, halogen or sulfo or a halopyrimidine or halotriazine reactive radical which is further substituted or unsubstituted, or a radical of the formula

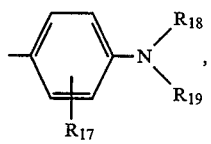
(11)

in which R$_{17}$ is hydrogen, C$_1$–C$_4$alkyl, C$_1$–C$_4$alkoxy, C$_2$–C$_6$alkanoylamino, C$_2$–C$_8$alkoxycarbonylamino, halogen or sulfo and R$_{18}$ and R$_{19}$ independently of one another are hydrogen, a halopyrimidine or halotriazine reactive radical which is further substituted or unsubstituted or C$_1$–C$_8$alkyl which is unsubstituted or substituted by hydroxyl, sulfo, sulfato, phenyl or C$_5$–C$_7$cycloalkyl, in which the phenyl radical can be further substituted by C$_1$–C$_4$alkyl, C$_1$–C$_4$alkoxy, C$_2$–C$_4$alkanoylamino, halogen or sulfo and the C$_5$–C$_7$cycloalkyl radical can be further substituted by C$_1$–C$_4$alkyl, or a radical of the formula

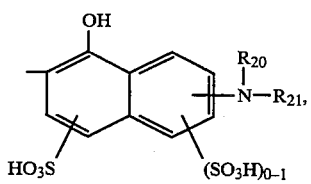
(12)

in which R$_{20}$ is hydrogen or C$_1$–C$_4$alkyl and R$_{21}$ is C$_2$–C$_6$alkanoyl, benzoyl which is unsubstituted or substituted by C$_1$–C$_4$alkyl, C$_1$–C$_4$alkoxy, C$_2$–C$_4$alkanoylamino, halogen or sulfo or a halopyrimidine or halotriazine reactive radical which is further substituted or unsubstituted.

Radicals A which are furthermore of interest are those of the formula

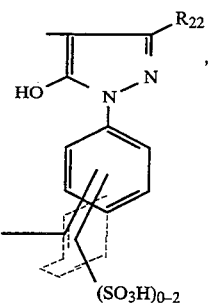
(12a)

in which R$_{22}$ is C$_1$–C$_4$alkyl or carboxyl, in particular methyl, and R$_{23}$ is hydrogen, C$_1$–C$_4$alkyl, C$_1$–C$_4$alkoxy, C$_2$–C$_4$alkanoylamino, halogen or Sulfo. The aromatic radical bonded in the 1-position is preferably a phenyl radical.

Preferred radicals of the formula (7) are those in which R$_5$ and R$_7$ independently of one another are C$_1$–C$_4$alkyl. R$_6$ is preferably cyano, carbamoyl or sulfomethyl.

Preferred radicals of the formula (8) are those in which R$_8$ and R$_9$ independently of one another are hydroxyl, amino or amino which is substituted by C$_1$–C$_8$alkyl, in particular C$_1$–C$_4$alkyl, in which the alkyl radical is unsubstituted or further substituted by hydroxyl, sulfo or sulfato and, with the exception of methyl, can be interrupted by oxygen. R$_{10}$ is preferably hydroxyl, phenyl or amino which is unsubstituted or substituted by cyano.

Preferred radicals of the formula (9) are those in which R$_{13}$ and R$_{14}$ independently of one another are hydrogen or C$_1$–C$_{12}$alkyl, in particular C$_1$–C$_8$alkyl and preferably C$_1$–C$_4$alkyl, which are unsubstituted or substituted by hydroxyl, sulfo or sulfato, in which the alkyl radical, with the exception of methyl, can be interrupted by oxygen.

Preferred radicals of the formula (10) are those in which R$_{16}$ is phenyl which is unsubstituted or substituted by C$_1$–C$_4$alkyl, C$_1$–C$_4$alkoxy, C$_2$–C$_4$alkanoylamino, halogen or sulfo, in particular unsubstituted phenyl. R$_{15}$ is preferably hydrogen.

Preferred radicals of the formula (11) are those in which R$_{18}$ and R$_{19}$ independently of one another are C$_1$–C$_8$alkyl which is unsubstituted or substituted by hydroxyl, sulfo, sulfato or phenyl, in which the phenyl radical can be further substituted by C$_1$–C$_4$alkyl, C$_1$–C$_4$alkoxy, C$_2$–C$_4$alkanoylamino, halogen or sulfo, in particular by sulfo. The radical R$_{17}$ is preferably hydrogen, C$_2$–C$_6$alkanoylamino, halogen or sulfo, in particular hydrogen or C$_2$–C$_6$alkanoylamino.

Preferably, of the radicals of the formulae (7) to (12), only the radical of the formula (12) contains a halopyrimidine or halotriazine radical which is further substituted or unsubstituted.

Preferred halopyrimidine or halotriazine reactive radicals which are further substituted or unsubstituted in the radicals of the formulae (9) to (12), in particular in the radical of the formula (12), are the reactive radicals of the formulae

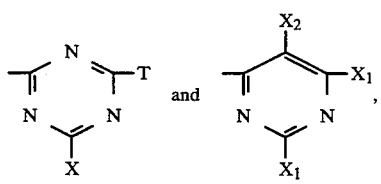

in which T, X, $X_1$ and $X_2$ are as defined and as preferred above for the reactive radicals of the formulae (4) and (6). $R_{20}$ in the radical of the formula (12) is preferably hydrogen.

Reactive dyes which are particularly preferred are those in which U is a radical of the formula (2), (2a), (2b) or (2d), and in which, in particular, W is a group of the formula —CONH— or —NHCO—, R is hydrogen, E is the radical —O— or —NH— and Y is a group of the formula —Cl, —OSO$_3$H, —SSO$_3$H, —OCO—CH$_3$, —OCO—C$_6$H$_5$ or —OPO$_3$H$_2$.

Reactive dyes which are especially preferred are those in which A is a radical of the formulae (7) to (12), U is a radical of the formula (2), (2a), (2b) or (2d), W is a group of the formula —CONH— or —NHCO—, R is hydrogen, E is the radical —O— or —NH— and Y is a group of the formula —Cl, —OSO$_3$H, —SSO$_3$H, —O-CO—CH$_3$, —OCO—C$_6$H$_5$ or —OPO$_3$H$_2$, in particular a group of the formula —Cl or —OSO$_3$H.

The reactive dyes of the formula (1) preferably contain at least one sulfo or sulfato group, in particular at least one sulfo group. They particularly preferably contain 1 to 5, in particular 2 to 5 sulfo and/or sulfato groups; preferably 2 to 5 sulfo groups. These are particularly preferably permanent sulfo and sulfato groups, i.e. those which are not removed during reaction of the reactive radical with fibre material.

The invention furthermore relates to a process for the preparation of the reactive dyes of the formula (1) which comprises diazotizing an amine of the formula

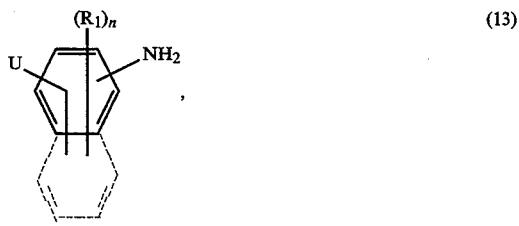

coupling the diazotization product to a compound of the formula

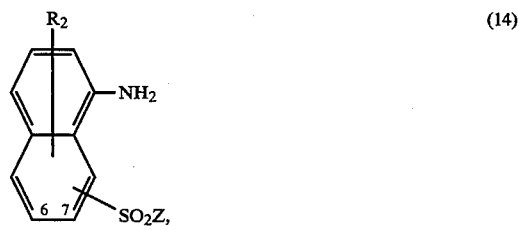

diazotizing the resulting intermediate and coupling the diazotization product to a compound of the formula

H—A (15), or diazotizing the intermediate directly and coupling the diazotization product to a compound of the formula (15), A, $R_1$, $R_2$, Z, n and U being as defined under formula (1).

The diazotization of the amine of the formula (13) and of the intermediate obtainable after coupling with the compound of the formula (14) is as a rule carried out by the action of nitrous acid in aqueous/mineral acid solution at a low temperature, for example 0° to 10° C., and the coupling to the coupling component of the formula (14) and (15) is carried out at an acid or neutral to weakly alkaline pH, in particular at a pH of 2 to 8.

A modified embodiment of the process comprises first preparing a dye which contains a precursor of the reactive radical and subsequently converting this into the final stage, for example by esterification or an addition reaction. For example a dye in which Z is a radical HO—CH$_2$CH$_2$— can be prepared and this product can be reacted with sulfuric acid such that the hydroxyl group is converted into the sulfato group. The sulfation of the hydroxyl group is carried out, for example, by reaction with concentrated sulfuric acid at 0° C. to a moderately elevated temperature.

The synthesis furthermore can be followed by elimination reactions. For example, reactive dyes of the formula (1) which contain sulfatoethylsulfonyl radicals can be treated with a base, for example sodium hydroxide, the sulfatoethylsulfonyl radicals being converted into vinylsulfonyl radicals.

In principle, the reactive dyes of the formula (1) can be prepared starting from precursors or intermediates for dyes which contain fibre-reactive radicals, or these fibre-reactive radicals can be introduced into intermediates which have a dye character and are suitable for this purpose.

In the process according to the invention for the preparation of the reactive dyes of the formula (1), the substituents of the compounds of the formulae (13), (14) and (15) are as defined and as preferred above.

The compounds of the formulae (13), (14) and (15) are known or can be prepared by processes analogous to known processes.

The reactive dyes of the formula (1) containing a sulfo or sulfato group are present either in the form of their free acid or preferably as salts thereof. Examples of suitable salts are the alkali metal salts, alkaline earth metal salts or ammonium salts or the salts of an organic amine. Examples are the sodium salts, lithium salts, potassium salts or ammonium salts or the salt of mono-, di- or triethanolamine.

The reactive dyes of the formula (1) are suitable for dyeing and printing widely varying materials, such as fibre materials containing hydroxyl groups or nitrogen. Examples are silk, leather, wool, polyamide fibres and polyurethanes, and in particular all types of cellulosic fibre materials. Such cellulosic fibre materials are, for example, the naturally occurring cellulose fibres, such as cotton, linen and hemp, and cellulose and regenerated cellulose. The reactive dyes of the formula (1) are also suitable for dyeing or printing fibres which contain hydroxyl groups and are contained in blend fabrics, for example blends of cotton with polyester fibres or polyamide fibres. The reactive dyes of the formula (1) are particularly suitable for dyeing or printing cellulosic fibre materials or, in particular, naturally occurring or synthetic polyamide fibre materials.

The dyes according to the invention can be applied to the fibre material and fixed on the fibre in various ways, in particular in the form of aqueous dye solutions and printing pastes. They are suitable both for the exhaust process and for dyeing by the pad dyeing process, in which the goods are impregnated with aqueous dye solutions, which contain salts if appropriate, and the dyes are fixed, after treatment with an alkali or in the presence of an alkali and if appropriate under the action of heat. They are particularly suitable for the so-called cold pad-batch process, in which the dye is applied on the padder together with the alkali and is then fixed by storage at room temperature for several hours. After the fixing, the dyeings or prints are rinsed thoroughly with cold and hot water, if appropriate with addition of a dispersing agent which promotes diffusion of the non-fixed portions.

The reactive dyes of the formula (1) are distinguished by a high reactivity, a good fixing capacity and a very good build-up capacity. They can therefore be employed by the exhaust dyeing process at low dyeing temperatures, and require only short steaming times in the pad-steam process. The degrees of fixing are high and the non-fixed portions can easily be washed off, the difference between the degree of exhaustion and degree of fixing being remarkably low, i.e. the soaping loss is very low. The reactive dyes of the formula (1) are also particularly suitable for printing, in particular on cotton, but also for printing nitrogen-containing fibres, for example wool or silk or blend fabrics containing wool for 2 hours until coupling is complete. The pH is kept at a value of 2.5 to 3 by addition of sodium bicarbonate. The solution thus prepared contains the compound which, in the form of the free acid, has the formula

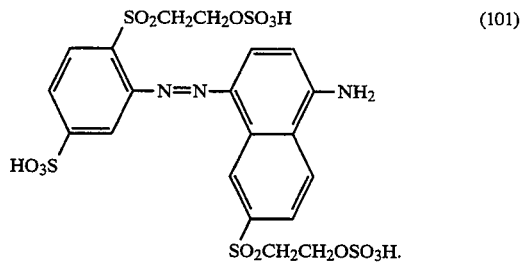

(101)

The solution thus obtained is diazotized in the customary manner, by acidification with concentrated hydrochloric acid and addition of an aqueous sodium nitrite solution, and the diazotization product is then added to a mixture of 85 parts of 1-benzoylamino-8-naphthol-3,6-disulfonic acid in 800 parts of water. The mixture is subsequently stirred for 2 hours until coupling is complete. The pH is kept at a value of 6 to 7 by addition of sodium bicarbonate. The resulting dye is then subjected to reverse osmosis and freeze dried. A dye is obtained which, in the form of the free acid, is the compound of the formula

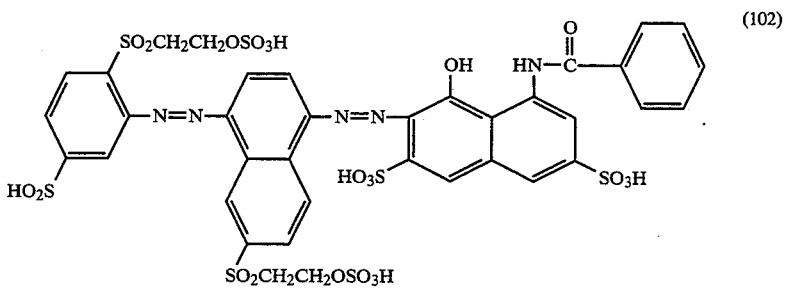

(102)

or silk.

The dyeings and prints produced with the dyes according to the invention have a high colour strength and a high fibre-dye bond stability both in the acid and in the alkaline range, and furthermore a good fastness to light and very good wet fastness properties, such as fastnesses to washing, water, sea-water, crossdyeing and perspiration, and a good fastness to pleating, fastness to ironing and fastness to rubbing.

The following examples serve to illustrate the invention. The temperatures are stated in degrees Celcius, and parts and percentages are by weight, unless stated otherwise. Parts by weight bear the same relation to parts by volume as the kilogram to the liter.

Example 1

72 parts of aniline-2-β-sulfatoethylsulfonyl-5-sulfonic acid in 500 parts of an ice-water suspension are acidified with 45 parts of concentrated hydrochloric acid and diazotized with 40 parts of a 5 normal sodium nitrite solution. The mixture is subsequently stirred at a temperature of about 5° C. for one hour and excess nitrous acid is then destroyed by means of amidosulfonic acid. The diazonium salt solution thus prepared is allowed to run slowly into a solution of 66 parts of 1-naphthylamino-6-β-sulfatoethylsulfone in 600 parts of water at a pH of 2.5 to 3. The mixture is subsequently stirred The dye of the formula (102) dyes cotton and wool in dark blue colour shades.

Example 2 a) 56 parts of aniline-4-β-sulfatoethylsulfone in 500 parts of an ice-water suspension are acidified with 45 parts of concentrated hydrochloric acid and diazotized with 40 parts of a 5 normal sodium nitrite solution. The mixture is subsequently stirred at a temperature of about 5° C. for one hour and excess nitrous acid is then destroyed by means of amidosulfonic acid. The diazonium salt solution thus prepared is allowed to run slowly into a solution of 66 parts of 1-naphthylamino-6-β-sulfatoethylsulfone in 600 parts of water at a pH of 2.5 to 3. The mixture is subsequently stirred for 2 hours until coupling is complete. The pH is kept at a value of 2.5 to 3 by addition of sodium bicarbonate. The solution thus prepared contains the compound which, in the form of the free acid, has the formula

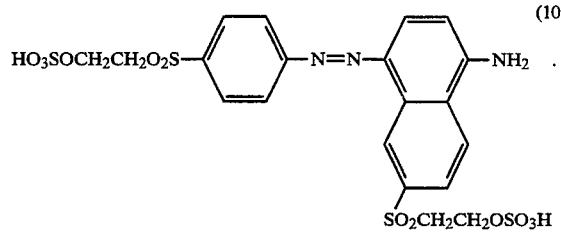

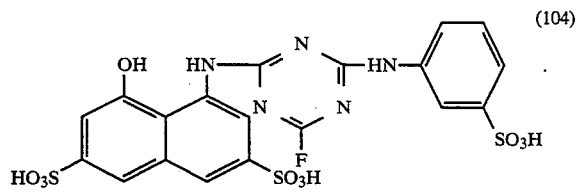

b) A separate solution of a coupling component is prepared. For this, 64 parts of 1-amino-8-naphthol-3,6-disulfonic acid are dissolved in 800 parts of water at a pH of 4.5 to 5, with addition of 15 parts of sodium carbonate. The mixture is then cooled to a temperature of 0° C. and 28 parts of cyanuric fluoride are added dropwise, the pH being kept at a value of 3 to 4 by sprinkling sodium bicarbonate. The mixture is subsequently stirred at a pH of 3 to 4 and at a temperature of 0° C. for 15 minutes and a solution of the sodium salt of 38 parts of aniline-3-sulfonic acid is then added. The mixture is stirred at a pH of 5 and at a temperature of 20° to 25° C. for 5 hours, until no further free amine is detectable by a diazotization sample. The solution thus prepared contains the compound which, in the form of the free acid, has the formula c) The solution obtained according to step a) is diazotized in the customary manner, by acidification with concentrated hydrochloric acid and addition of an aqueous sodium nitrite solution, and the diazotization product is then allowed to run slowly into the solution, prepared according to step b), of the coupling component of the formula (104) at a pH of 6 to 7. The mixture is subsequently stirred for 2 hours until coupling is complete. The pH is kept at a value of 6.5 to 7 by addition of sodium carbonate. The dye is then precipitated with sodium chloride, isolated on a suction filter and dried at a temperature of 40° to 50° C. A dye is obtained which, in the form of the free acid, is the compound of the formula

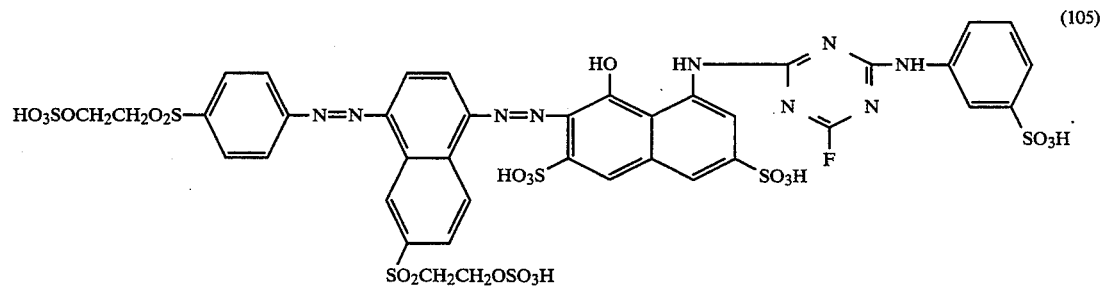

The dye of the formula (105) dyes cotton and wool in dark blue colour shades.

Examples 3 to 60

The reactive dyes which are shown in column 2 in the following table and dye wool and cotton in the colour shades shown in column 3 can be obtained analogously to Examples 1 and 2.

TABLE

| Example | Reactive dye | Colour shade |
|---|---|---|
| 3 | 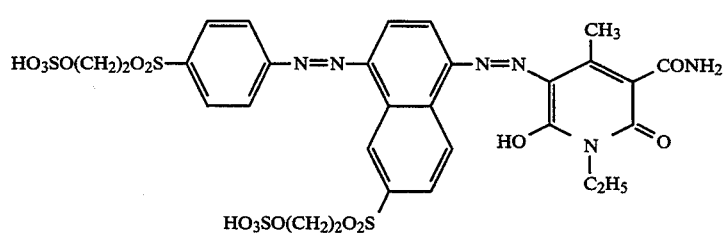 | Orange |

TABLE-continued

| Example | Reactive dye | Colour shade |
|---|---|---|
| 4 | HO₃SO(CH₂)₂O₂S—C₆H₄—N=N—[naphthalene, 6-HO₃SO(CH₂)₂O₂S]—N=N—C(pyridone: CH₃, CH₂SO₃H, HO, =O, N-C₂H₅) | Orange |
| 5 | HO₃SO(CH₂)₂O₂S—C₆H₄—N=N—[naphthalene, 6-HO₃SO(CH₂)₂O₂S]—N=N—C(pyridine: CH₃, CN, HO(CH₂)₂HN, NH(CH₂)₂OH) | Claret |
| 6 | HO₃SO(CH₂)₂O₂S—C₆H₄—N=N—[naphthalene, 6-HO₃SO(CH₂)₂O₂S]—N=N—(pyrimidine: HO, HO, OH) | Orange |
| 7 | HO₃SO(CH₂)₂O₂S—C₆H₄—N=N—[naphthalene, 6-HO₃SO(CH₂)₂O₂S]—N=N—(pyrimidine: H₂N, NH₂, H₂N) | Red |
| 8 | HO₃SO(CH₂)₂O₂S—C₆H₄—N=N—[naphthalene, 6-HO₃SO(CH₂)₂O₂S]—N=N—(pyrimidine: HO, HO, NHCN) | Orange |
| 9 | HO₃SO(CH₂)₂O₂S—C₆H₄—N=N—[naphthalene, 6-HO₃SO(CH₂)₂O₂S]—N=N—C₆H₄—N((CH₂)₂OH)((CH₂)₂OH) | Red |

TABLE-continued

| Example | Reactive dye | Colour shade |
|---|---|---|
| 10 | (structure: HO$_3$SO(CH$_2$)$_2$O$_2$S—C$_6$H$_4$—N=N—naphthalene(with HO$_3$SO(CH$_2$)$_2$O$_2$S substituent)—N=N—C$_6$H$_3$(NHCOCH$_3$)—N(C$_2$H$_5$)$_2$) | Claret |
| 11 | (structure: HO$_3$SO(CH$_2$)$_2$O$_2$S—C$_6$H$_4$—N=N—naphthalene(HO$_3$SO(CH$_2$)$_2$O$_2$S)—N=N—naphthalene(OH, 2 SO$_3$H, NHCOC$_6$H$_5$)) | Navy blue |
| 12 | (structure: HO$_3$SO(CH$_2$)$_2$O$_2$S—C$_6$H$_4$—N=N—naphthalene(HO$_3$SO(CH$_2$)$_2$O$_2$S)—N=N—naphthalene(NHC$_6$H$_5$, SO$_3$H)) | Dark blue |
| 13 | (structure: HO$_3$SO(CH$_2$)$_2$O$_2$S—C$_6$H$_4$—N=N—naphthalene(HO$_3$SO(CH$_2$)$_2$O$_2$S)—N=N—naphthalene(OH, 2 SO$_3$H, NH-triazine with Cl and N(C$_6$H$_5$)(C$_2$H$_5$))) | Navy blue |
| 14 | (structure: HO$_3$SO(CH$_2$)$_2$O$_2$S—C$_6$H$_4$—N=N—naphthalene(HO$_3$SO(CH$_2$)$_2$O$_2$S)—N=N—naphthalene(OH, SO$_3$H, SO$_3$H, NHCOC$_6$H$_5$)) | Dark blue |

TABLE-continued
| Example | Reactive dye | Colour shade |
|---|---|---|
| 15 | 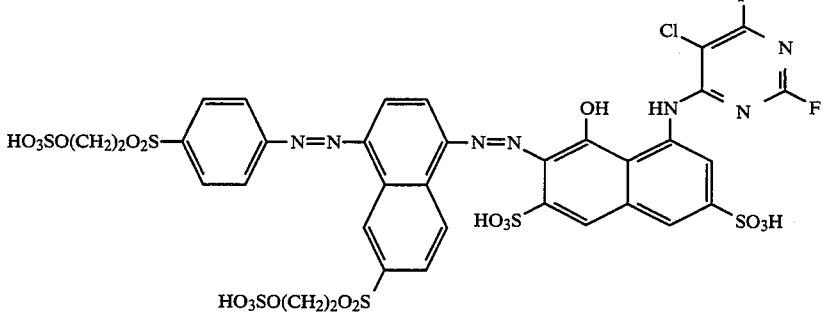 | Navy blue |
| 16 | 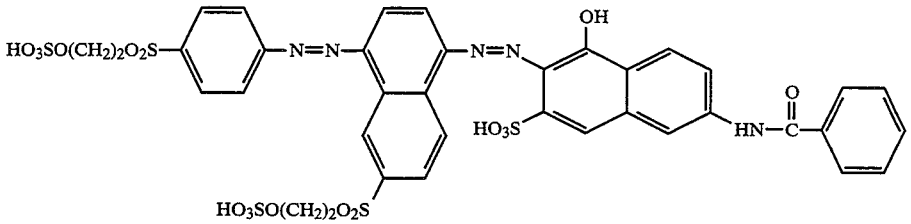 | Violet |
| 17 | 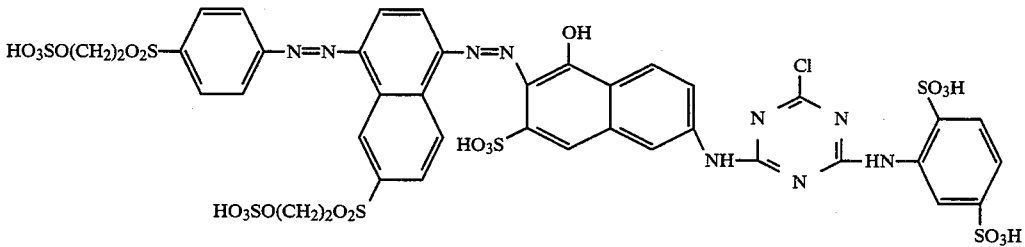 | Violet |
| 18 | 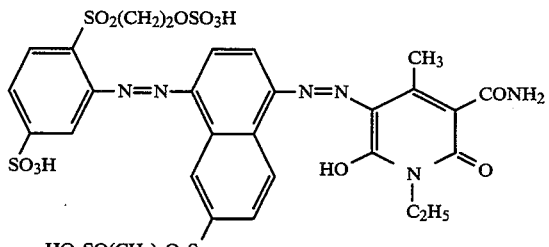 | Orange |
| 19 | 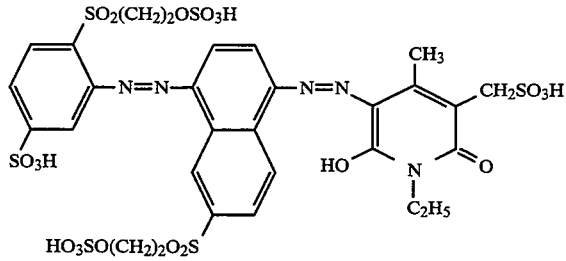 | Orange |

TABLE-continued
| Example | Reactive dye | Colour shade |
|---|---|---|
| 20 | 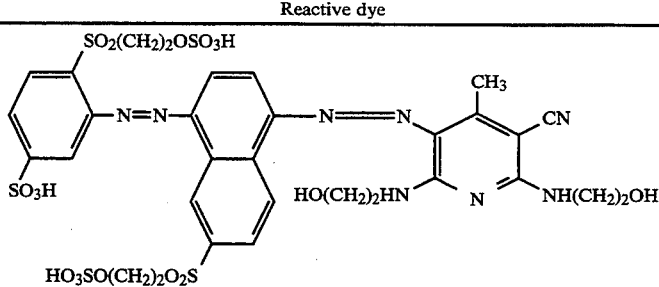 | Claret |
| 21 | 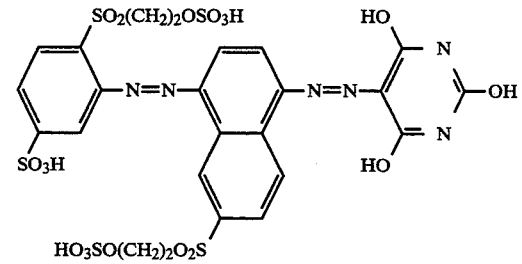 | Golden orange |
| 22 | 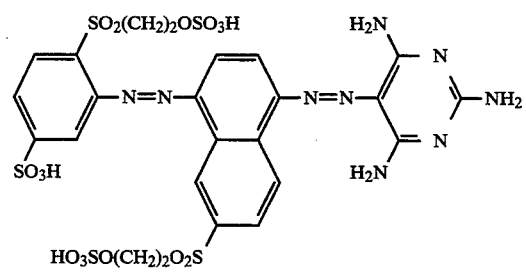 | Red |
| 23 | 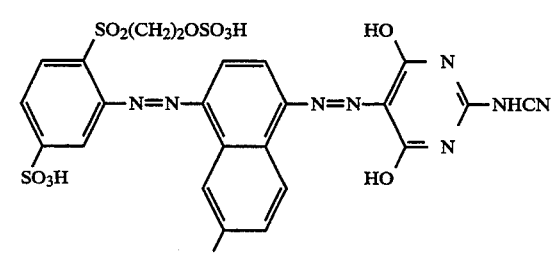 | Orange |
| 24 | 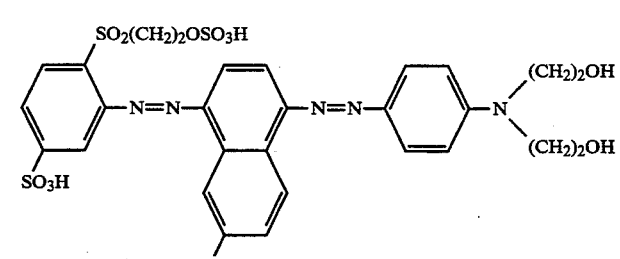 | Red |
| 25 | 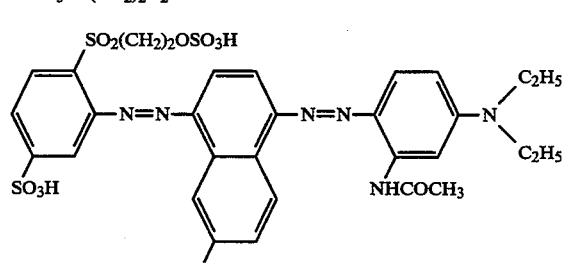 | Claret |

TABLE-continued
| Example | Reactive dye | Colour shade |
|---|---|---|
| 26 | 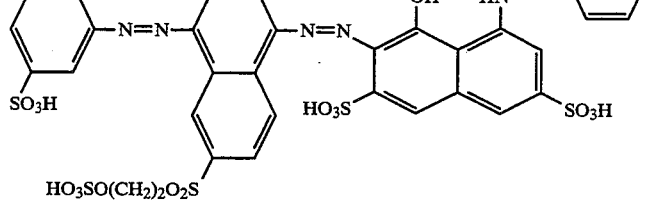 | Navy blue |
| 27 | 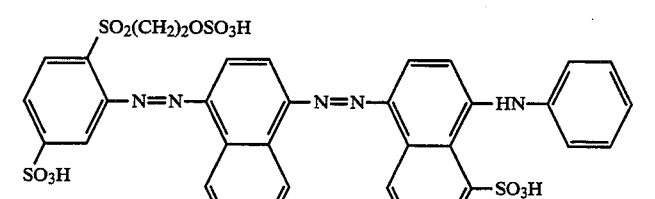 | Dark blue |
| 28 | 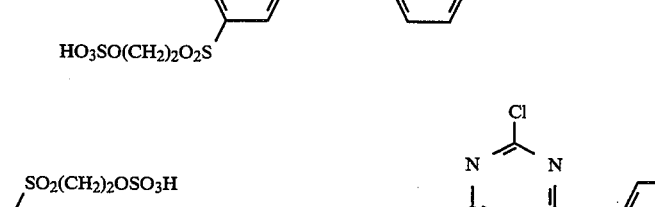 | Navy blue |
| 29 | 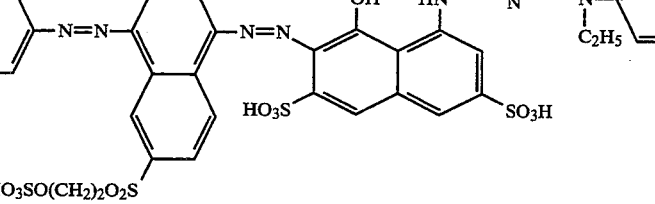 | Dark blue |
| 30 | 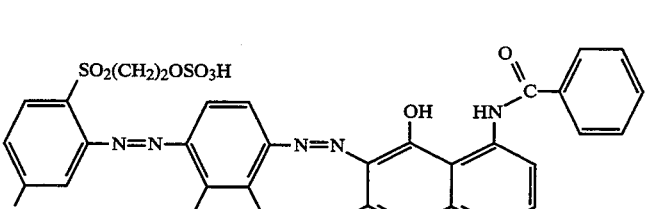 | Navy blue |

TABLE-continued
| Example | Reactive dye | Colour shade |
|---|---|---|
| 31 | 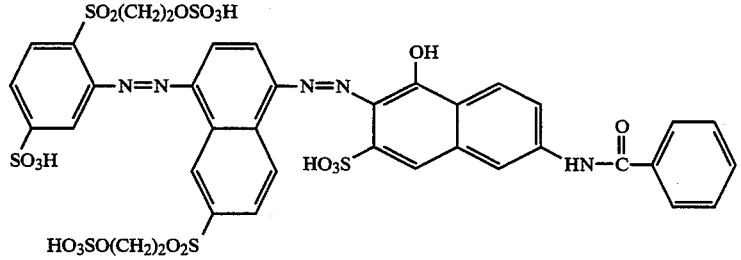 | Violet |
| 32 | 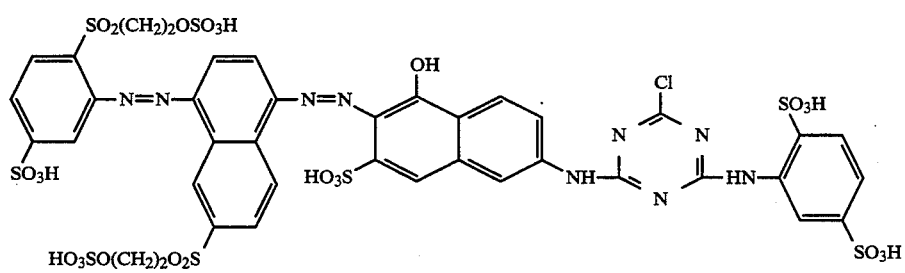 | Violet |
| 33 | 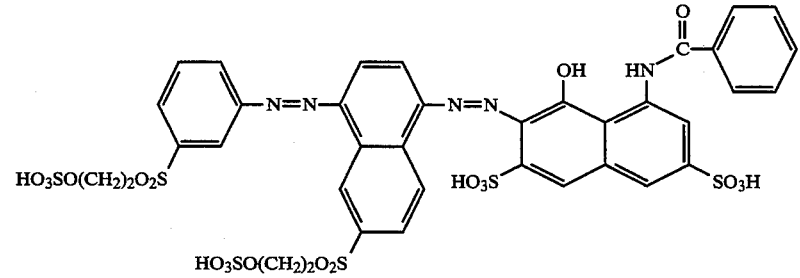 | Navy blue |
| 34 | 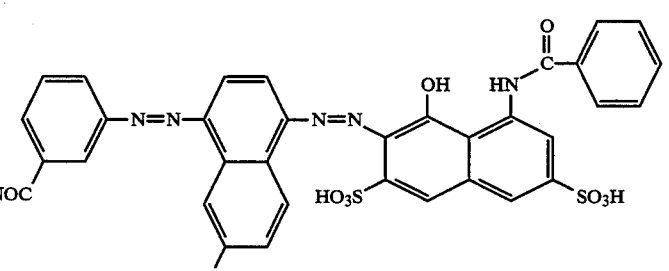 | Navy blue |
| 35 | 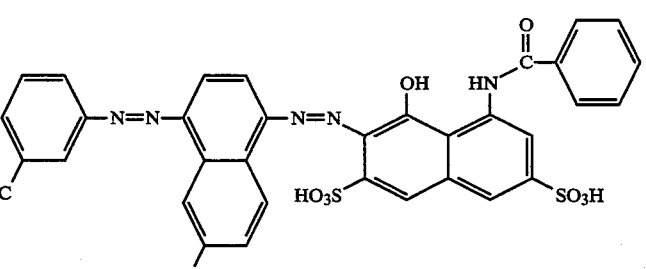 | Navy blue |

TABLE-continued
| Example | Reactive dye | Colour shade |
|---|---|---|
| 36 | 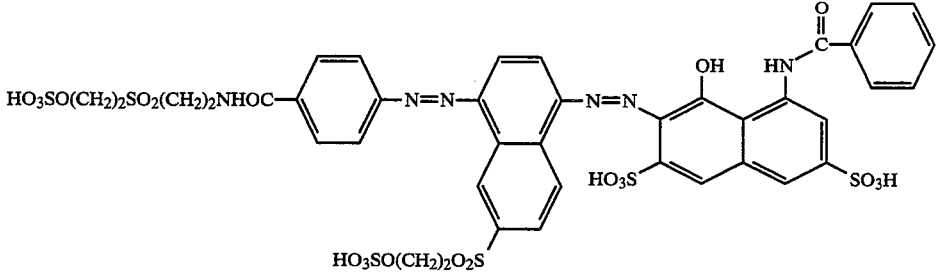 | Navy blue |
| 37 | 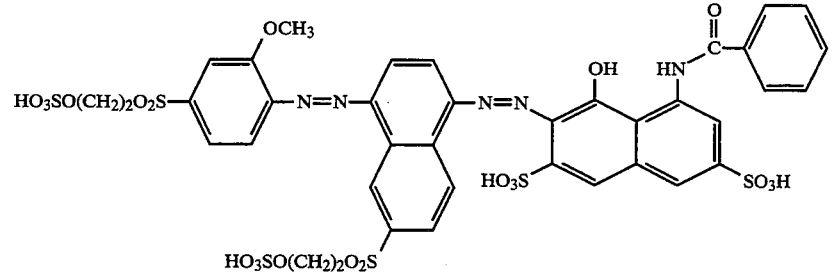 | Navy blue |
| 38 | 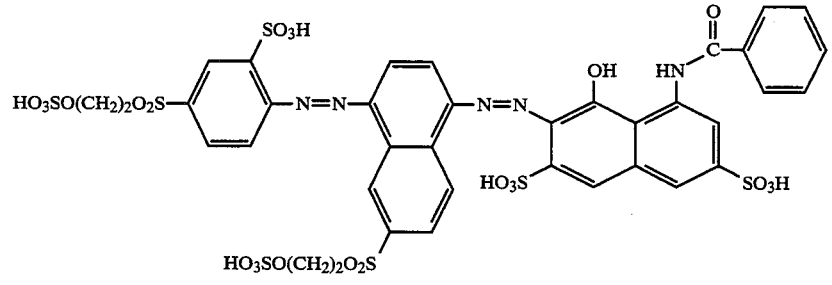 | Navy blue |
| 39 | 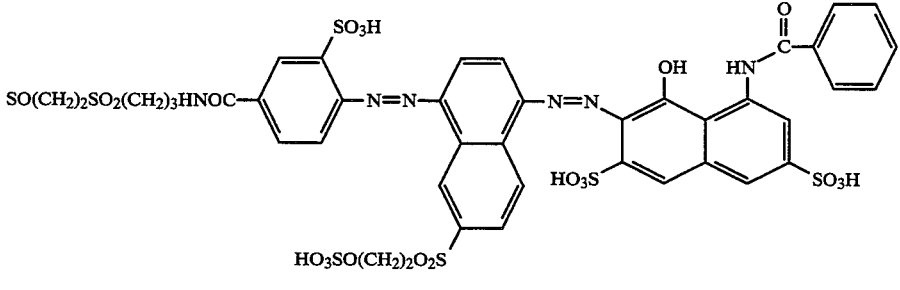 | Navy blue |
| 40 | 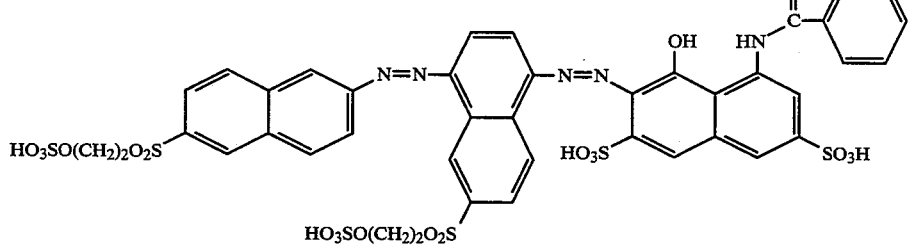 | Navy blue |

TABLE-continued

| Example | Reactive dye | Colour shade |
|---|---|---|
| 41 | (structure) | Navy blue |
| 42 | (structure) | Navy blue |
| 43 | (structure) | Navy blue |
| 44 | (structure) | Navy blue |
| 45 | (structure) | Navy blue |

TABLE-continued

| Example | Reactive dye | Colour shade |
|---|---|---|
| 46 | HO₃SO(CH₂)₂O₂S–C₆H₄–N=N–(naphthalene)–N=N–[pyridone: CH₃, CONH₂, HO, N-C₂H₅, =O]; naphthalene bears HO₃SO(CH₂)₂O₂S | Orange |
| 47 | HO₃SO(CH₂)₂O₂S–C₆H₄–N=N–(naphthalene)–N=N–[pyridone: CH₃, CH₂SO₃H, HO, N-C₂H₅, =O]; naphthalene bears HO₃SO(CH₂)₂O₂S | Orange |
| 48 | HO₃SO(CH₂)₂O₂S–C₆H₄–N=N–(naphthalene)–N=N–[pyridine: CH₃, CN, HO(CH₂)₂HN, NH(CH₂)₂OH]; naphthalene bears SO₂(CH₂)₂OSO₃H | Claret |
| 49 | HO₃SO(CH₂)₂O₂S–C₆H₄–N=N–(naphthalene)–N=N–[pyrimidine: HO, OH, HO]; naphthalene bears SO₂(CH₂)₂OSO₃H | Orange |
| 50 | HO₃SO(CH₂)₂O₂S–C₆H₄–N=N–(naphthalene)–N=N–[pyrimidine: H₂N, NH₂, H₂N]; naphthalene bears SO₂(CH₂)₂OSO₃H | Red |
| 51 | HO₃SO(CH₂)₂O₂S–C₆H₄–N=N–(naphthalene)–N=N–[pyrimidine: HO, NHCN, HO]; naphthalene bears SO₂(CH₂)₂OSO₃H | Orange |

TABLE-continued
| Example | Reactive dye | Colour shade |
|---|---|---|
| 52 | 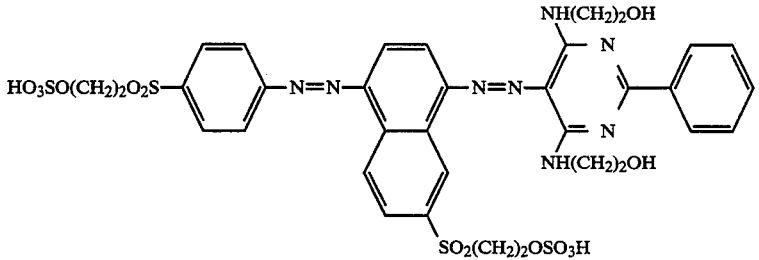 | Red |
| 53 | 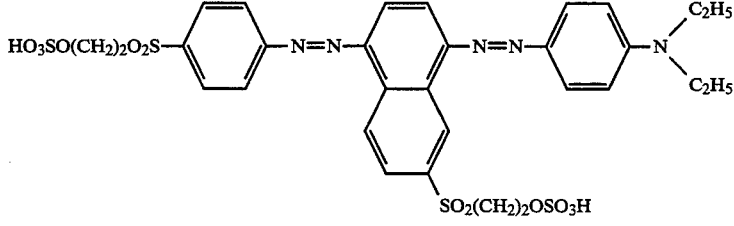 | Red |
| 54 | 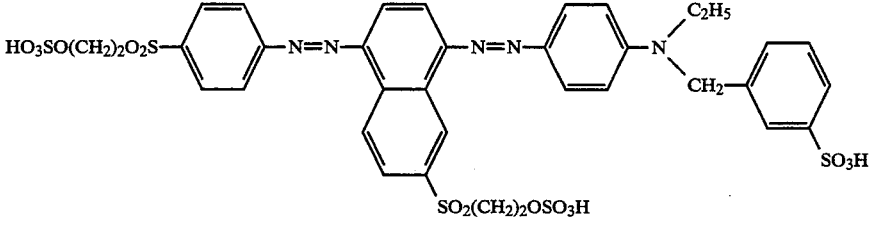 | Red |
| 55 | 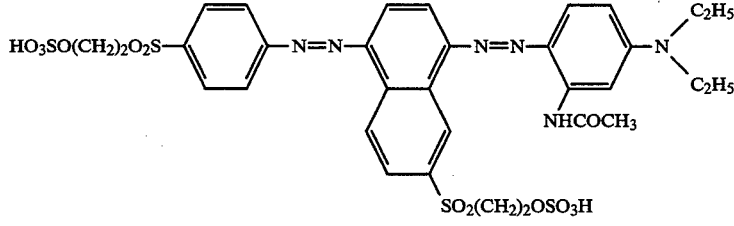 | Navy blue |
| 56 | 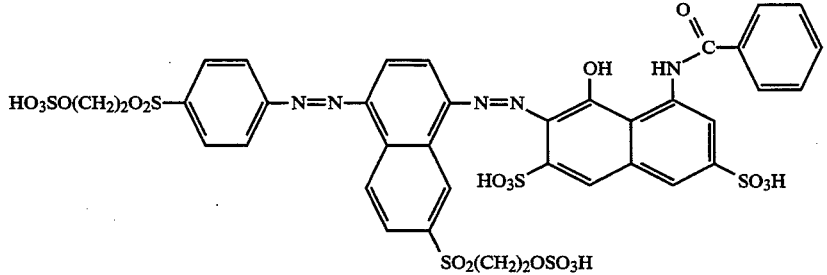 | Navy blue |
| 57 | 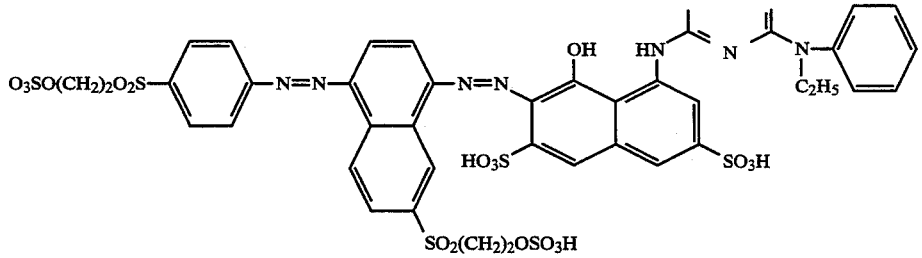 | Navy blue |

TABLE-continued

| Example | Reactive dye | Colour shade |
|---|---|---|
| 58 | 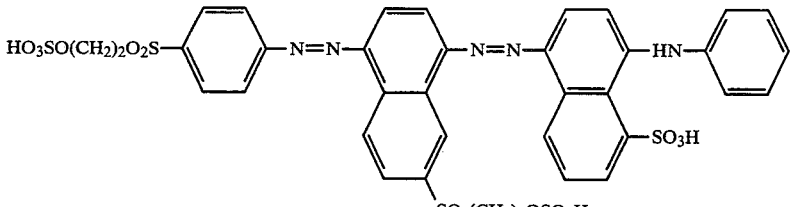 | Navy blue |
| 59 | 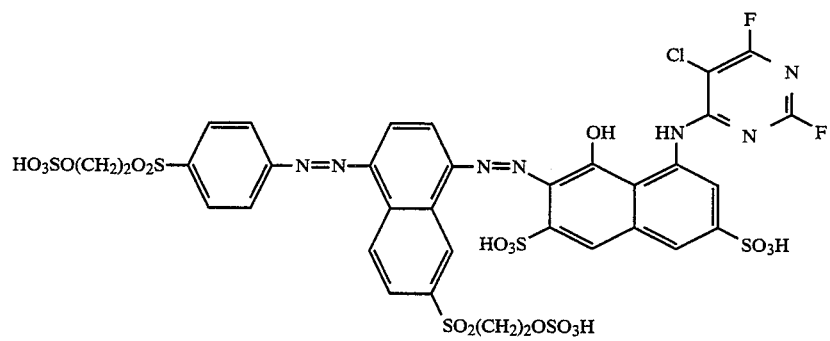 | Navy blue |
| 60 | 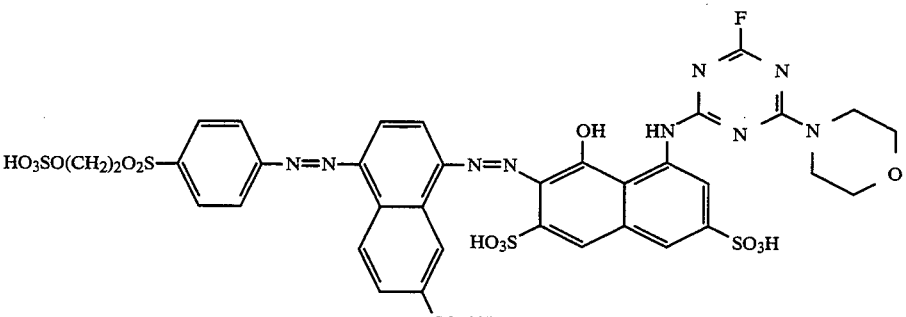 | Navy blue |

Dyeing Instructions 2 parts of the reactive dye obtained according to Example 1 are dissolved in 400 parts of water; 1500 parts of a solution containing 53 g of sodium chloride per liter are added. 100 parts of cotton fabric are introduced into this dyebath at 40° C. After 45 minutes, 100 parts of a solution containing 16 g of sodium hydroxide and 20 g of calcined sodium carbonate per liter are added. The temperature of the dyebath is kept at 40° C. for a further 45 minutes. Thereafter, the dyed goods are rinsed, soaped at the boil with a nonionic detergent for a quarter of an hour, rinsed again and dried.

Printing Instructions 3 parts of the reactive dye obtained according to Example 1 are sprinkled into 100 parts of a stock thickener mixture comprising 50 parts of 5% sodium alginate thickener, 27.8 parts of water, 20 parts of urea, 1 part of sodium m-nitrobenzenesulfonate and 1.2 parts of sodium bicarbonate while stirring rapidly. A cotton fabric is printed with the printing paste thus obtained and is dried, and the resulting printed material is steamed in saturated steam at 102° C. for 2 minutes. The printed fabric is then rinsed, soaped at the boil, if appropriate, and rinsed again, and then dried.

What is claimed is:

1. A reactive dye of the formula

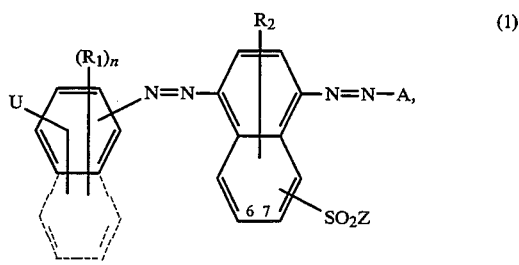

in which A is a radical of the formula

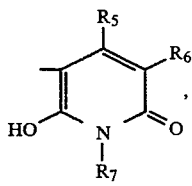

(7)

in which $R_5$ and $R_7$ independently of one another are hydrogen, $C_1$–$C_4$alkyl or phenyl which is unsubstituted or substituted by $C_1$–$C_4$alkyl, $C_1$–$C_4$alkoxy, $C_2$–$C_4$alkanoylamino, halogen or sulfo, and $R_6$ is hydrogen, cyano, carbamoyl or sulfomethyl, or a radical of the formula

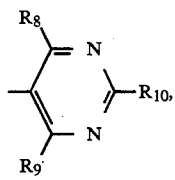

(8)

in which $R_8$ and $R_9$ independently of one another are hydroxyl, amino or amino which is substituted by $C_1$–$C_{12}$alkyl, in which the $C_1$–$C_{12}$alkyl radical is unsubstituted or further substituted by hydroxyl, sulfo or sulfato and, with the exception of methyl, can be interrupted by oxygen, and $R_{10}$ is hydrogen, $C_1$–$C_4$alkyl, hydroxyl amino which is unsubstituted or substituted by cyano, or is phenyl which is unsubstituted or substituted by $C_1$–$C_4$alkyl, $C_1$–$C_4$alkoxy, $C_2$–$C_4$alkanoylamino, halogen or sulfo, or a radical of the formula

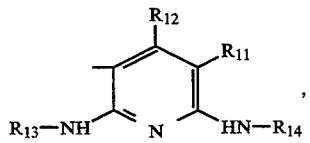

(9)

in which $R_{11}$ is cyano, carbamoyl or sulfomethyl, $R_{12}$ is $C_1$–$C_4$alkyl and $R_{13}$ and $R_{14}$ independently of one another are hydrogen, a halopyrimidine or halotriazine reactive radical which is further substituted or unsubstituted, or $C_1$–$C_{12}$alkyl which is unsubstituted or substituted by hydroxyl, sulfo or sulfato, in which the $C_1$–$C_{12}$alkyl radical, with the exception of methyl, can be interrupted by oxygen, or a radical of the formula

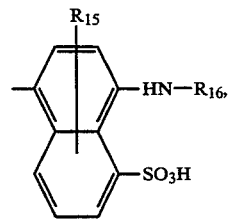

(10)

in which $R_{15}$ is hydrogen, $C_1$–$C_4$alkyl, $C_1$–$C_4$alkoxy, $C_2$–$C_4$alkanoylamino, halogen or sulfo and $R_{16}$ is phenyl which is unsubstituted or substituted by $C_1$–$C_4$alkyl, $C_1$–$C_4$alkoxy, $C_2$–$C_4$alkanoylamino, halogen or sulfo, or is a halopyrimidine or halotriazine reactive radical which is further substituted or unsubstituted, or a radical of the formula

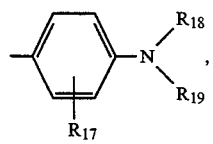

(11)

in which $R_{17}$ is hydrogen, $C_1$–$C_4$alkyl, $C_1$–$C_4$alkoxy, $C_2$–$C_6$alkanoylamino, $C_2$–$C_8$alkoxy-carbonylamino, halogen or sulfo and $R_{18}$ and $R_{19}$ independently of one another are hydrogen, a halopyrimidine or halotriazine reactive radical which is further substituted or unsubstituted, or $C_1$–$C_8$alkyl which is unsubstituted or substituted by hydroxyl, sulfo, sulfato, phenyl or $C_5$–$C_7$cycloalkyl, in which the phenyl radical can be further substituted by $C_1$–$C_4$alkyl, $C_1$–$C_4$alkoxy, $C_2$–$C_4$alkanoylamino, halogen or sulfo and the $C_5$–$C_7$cycloalkyl radical can be further substituted by $C_1$–$C_4$alkyl, or a radical of the formula

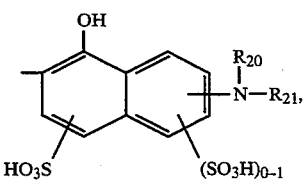

(12)

in which $R_{20}$ is hydrogen or $C_1$–$C_4$alkyl and $R_{21}$ is $C_2$–$C_6$alkanoyl, benzoyl which is unsubstituted or substituted by $C_1$–$C_4$alkyl, $C_1$–$C_4$alkoxy, $C_2$–$C_4$alkanoylamino, halogen or sulfo, or is a halopyrimidine or halotriazine reactive radical which is further substituted or unsubstituted, $R_1$ and $R_2$ independently of one another are hydrogen, $C_1$–$C_4$alkyl, $C_1$–$C_4$alkoxy, $C_2$–$C_4$alkanoylamino, halogen or sulfo, Z is a group of the formula —CH=CH$_2$ or —CH$_2$—CH$_2$—Y and Y is a leaving group, n is the number 1, 2 or 3 and U is a reactive radical of the formula

$$-SO_2-Z' \qquad (2)$$

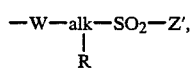

$$-W-alk-SO_2-Z', \qquad (2a)$$
$$\quad\quad\quad |$$
$$\quad\quad\quad R$$

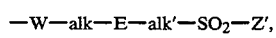

$$-W-alk-E-alk'-SO_2-Z', \qquad (2b)$$

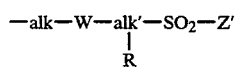

$$-alk-W-alk'-SO_2-Z' \qquad (2c)$$
$$\quad\quad\quad |$$
$$\quad\quad\quad R$$

or

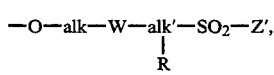

$$-O-alk-W-alk'-SO_2-Z', \qquad (2d)$$
$$\quad\quad\quad\quad |$$
$$\quad\quad\quad\quad R$$

in which W is a group of the formula —SO$_2$—NR$_3$—, —CONR$_3$— or —NR$_3$CO—, R$_3$ is hydrogen, $C_1$–$C_4$alkyl which is unsubstituted or substituted by hydroxyl, sulfo, sulfato, carboxyl or cyano, or a radical of the formula

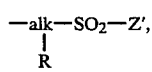

$$-alk-SO_2-Z',$$
$$\quad |$$
$$\quad R$$

R is hydrogen, hydroxyl, sulfo, sulfato, carboxyl, cyano, halogen, $C_1$–$C_4$alkoxycarbonyl, $C_1$–$C_4$alkanoyloxy, carbamoyl or the group —SO$_2$Z′, Z′ is as defined above for Z, E is the radical —O— or —NR$_4$—, R$_4$ is hydrogen or C$_1$-C$_4$alkyl and alk and alk′ independently of one another are C$_1$-C$_6$alkylene.

2. A reactive dye according to claim 1, in which the radical —SO$_2$Z is bonded to the naphthylene middle component in the 6- or 7-position.

3. A reactive dye according to claim 1, in which U is a radical of the formula (2), (2a), (2b) or (2d).

4. A reactive dye according to claim 1, in which R is hydrogen, W is a group of the formula —CONH— or —NHCO— and E is the radical —O— or —NH—.

5. A reactive dye according to claim 1, in which Y is a group of the formula —Cl, —OSO$_3$H, —SSO$_3$H, —OCO—CH$_3$, —OCO—C$_6$H$_5$ or —OPO$_3$H$_2$.

6. A reactive dye according to claim 1, in which U is a radical of the formula (2), (2a), (2b) or (2d), W is a group of the formula —CONH— or —NHCO—, R is hydrogen, E is the radical —O— or —NH— and Y is a group of the formula —Cl or —OSO$_3$H.

7. A reactive dye according to claim 1, which contains at least one sulfo or sulfato group.

8. A reactive dye according to claim 5, in which Y is a group of the formula —Cl or —OSO$_3$H.

9. A reactive dye according to claim 7, which contains at least one sulfo group.

10. A process for dyeing or printing fibre material containing hydroxyl groups or nitrogen, which comprises the step of applying to the fibre material a tinctorial amount of a reactive dye according to claim 1.

11. A process according to claim 10 wherein the fibre material is cellulosic fibre material or naturally occurring or synthetic polyamide fibre material.

* * * * *